(12) United States Patent
Page

(10) Patent No.: US 6,273,159 B1
(45) Date of Patent: Aug. 14, 2001

(54) WHEEL COVER FOR PREVENTING TIRE MARKS

(76) Inventor: Roger L. Page, 1310 S. Pahrump Valley Blvd., Pahrump, NV (US) 89048

( * ) Notice: Subject to any disclaimer, the term of this patent is extended or adjusted under 35 U.S.C. 154(b) by 0 days.

(21) Appl. No.: 09/351,157

(22) Filed: Jul. 12, 1999

Related U.S. Application Data

(63) Continuation-in-part of application No. 09/299,275, filed on Apr. 26, 1999.

(51) Int. Cl.$^7$ .................................................. B60C 27/00
(52) U.S. Cl. ......................... 152/170; 152/185; 152/208; 152/219
(58) Field of Search .................................. 152/170, 173, 152/175, 185, 185.1, 187, 217, 218, 219, 221, 174, 177, 184, 186

(56) References Cited

U.S. PATENT DOCUMENTS

| | | | |
|---|---|---|---|
| 822,177 | * | 5/1906 | Bardou .................................. 152/174 |
| 990,651 | * | 4/1911 | Heer ..................................... 152/221 |
| 1,267,360 | * | 5/1918 | Bertram ........................... 152/219 X |
| 1,303,224 | * | 5/1919 | Achtmeyer ....................... 152/186 X |
| 1,884,330 | * | 10/1932 | Stabili .................................. 152/174 |
| 5,044,411 | * | 9/1991 | Doll ..................................... 152/208 |
| 5,439,727 | * | 8/1995 | Riggs et al. ..................... 152/187 X |

* cited by examiner

Primary Examiner—Russell D. Stormer
(74) Attorney, Agent, or Firm—Jeffrey Weiss; Jeffrey D. Moy; Weiss & Moy, P.C.

(57) ABSTRACT

An apparatus which is used to cover a tire in order to prevent the tire from leaving marks on an area the tire travels across. The apparatus uses an elongated flexible piece of material of sufficient length to cover the outside circumference of the tire. The piece of material is used to cover the outside circumference of the tire to prevent the tire from leaving marks on an area the tire travels across. A connector is used for connecting a first end of the piece of material to a second end of the piece of material thereby securely coupling the piece of material to the outer circumference of the tire.

3 Claims, 4 Drawing Sheets

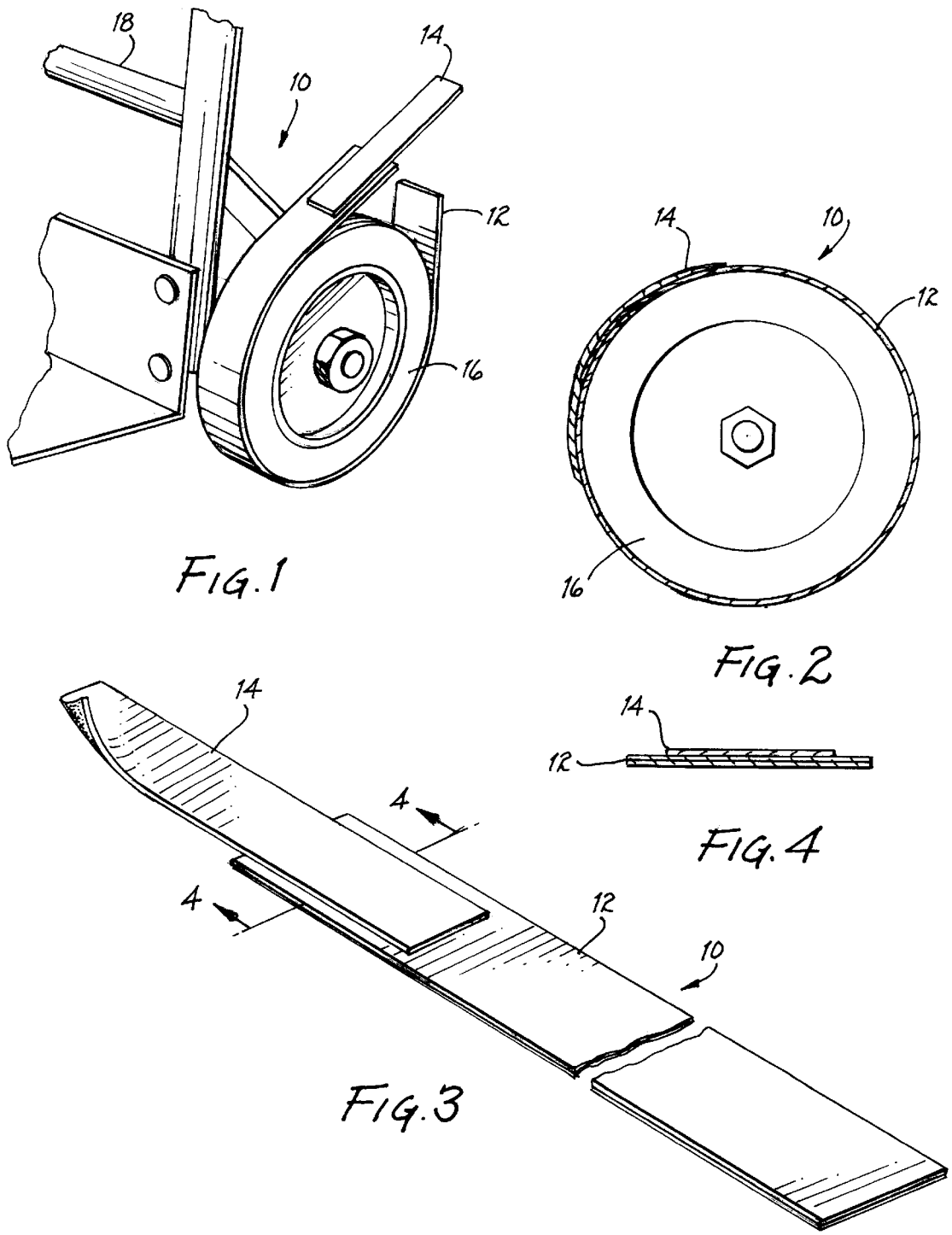

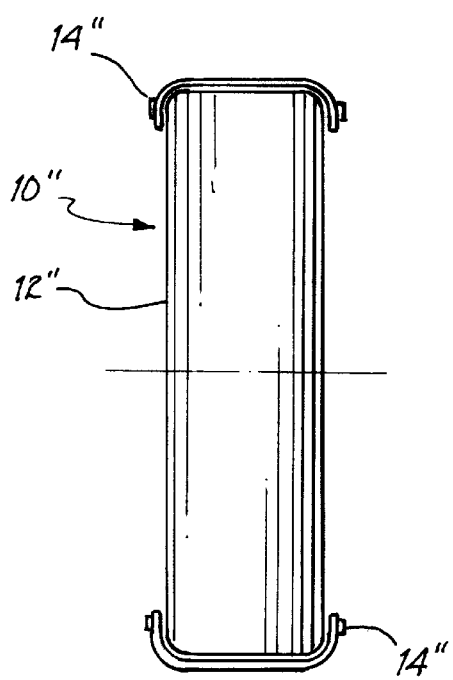
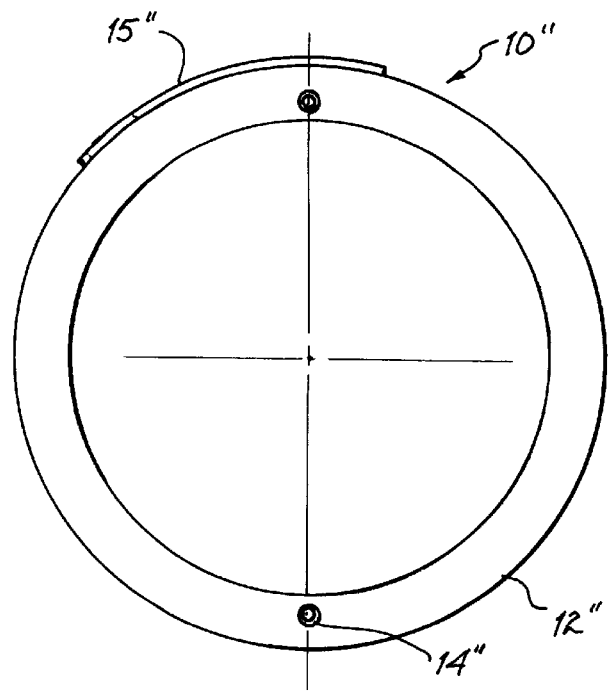
Fig. 8
Fig. 9

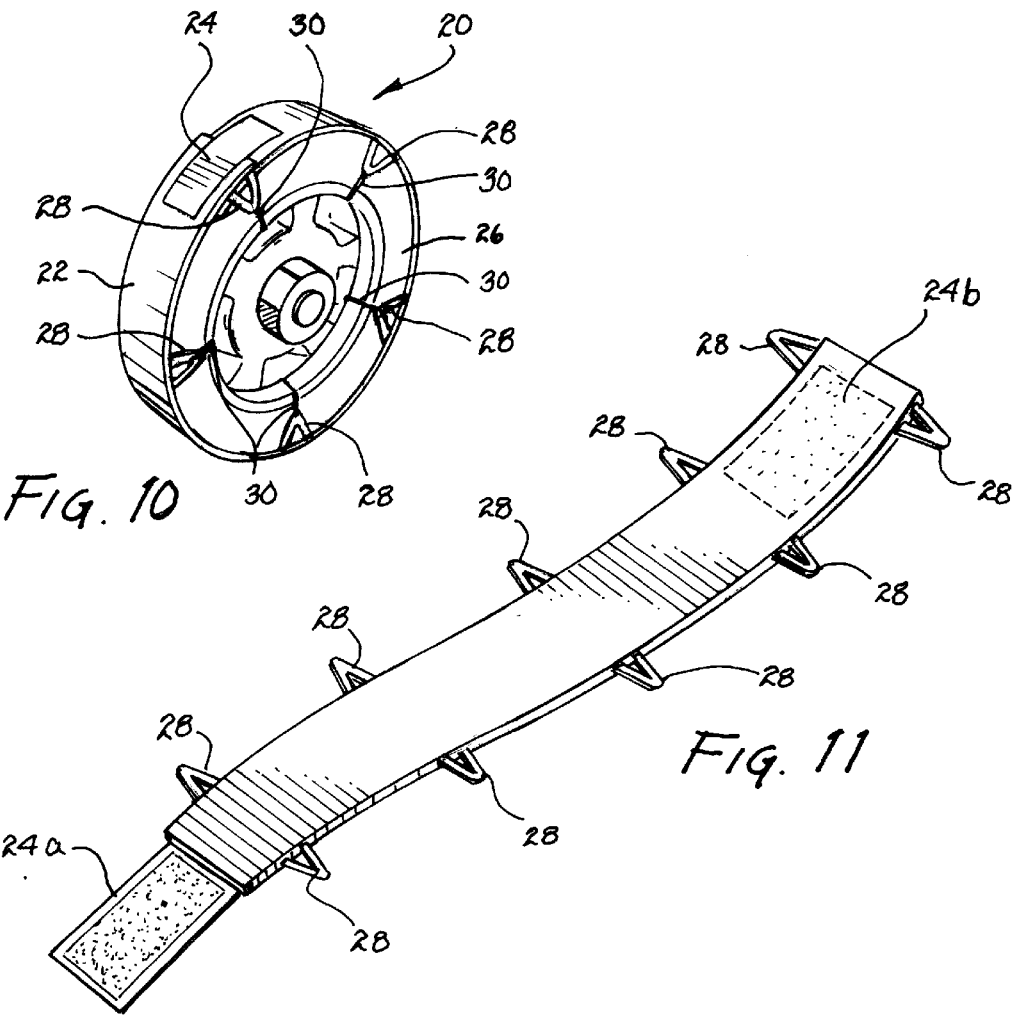
FIG. 10
FIG. 11
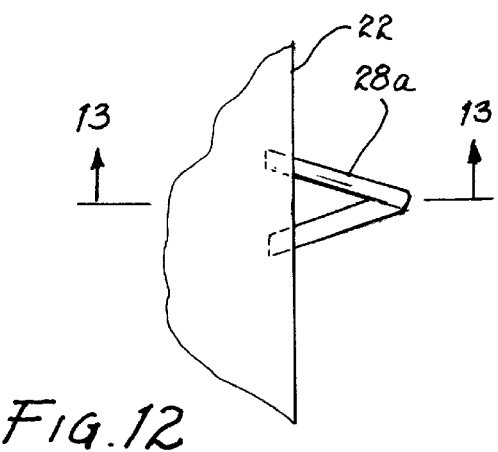
FIG. 12
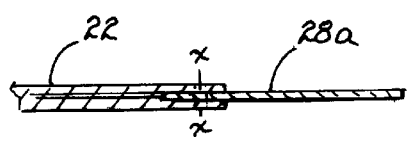
FIG. 13a
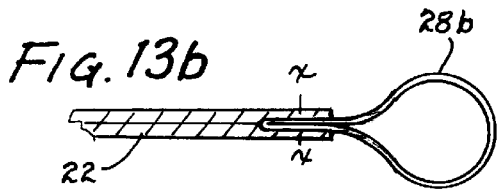
FIG. 13b

WHEEL COVER FOR PREVENTING TIRE MARKS

RELATED APPLICATION

This application is a continuation-in-part application of U.S. Ser. No. 09/299,275, filed in the United States Patent Office on Apr. 26, 1999 entitled "A WHEEL COVER FOR PREVENTING TIRE MARKS AND METHOD THERE-FOR" disclosure of which is hereby incorporated into this patent application by reference thereto.

BACKGROUND OF THE INVENTION

1. Field of the Invention

This invention relates generally to wheel covers and, more specifically, to a wheel cover or bootie which is placed over the tread of a tire to prevent the tire from leaving tire marks on the area over which the tire travels.

2. Description of the Prior Art

When setting up for a trade show or a convention, a large amount of equipment needs to be moved and installed. Much of this equipment is fairly heavy and is moved around the convention center or trade show floor by dollies, man lifts, or motorized vehicles (i.e., scissor lifts, fork lifts, condors and the like). The problem with using the dollies and motorized vehicles to move the equipment is that the rubber tires on the moving equipment tend to leave tire marks on the trade show or convention hall floor. These tire marks are extremely difficult to remove from the floor.

Wheel covers have been around for many years. U.S. Pat. No. 2,849,045, issued to E. E. Anderson, shows a wheel cover which is designed to fit over the outer surface of the tire. The wheel cover is used to protect the sidewall of the tire from the sunlight or other physical deteriorants. As may be seen in FIG. 1 of Anderson, the wheel cover shown and disclosed does not cover the tread portion of the tire. Thus, the wheel cover in Anderson does not prevent the tires from leaving markings over the area where the tire travels.

Therefore, a need existed to provide an improved wheel cover for a tire. The improved wheel cover would be used to cover the wheels of moving equipment. The improved wheel cover would be used to cover the wheels of moving equipment so that the wheels would not leave any markings across the area where the wheels travel. The improved wheel cover would be placed over the outer circumference of each wheel and cover the wheel tread thereby preventing the wheels from leaving marks across the area where the wheels travel.

SUMMARY OF THE INVENTION

In accordance with one embodiment of the present invention, it is an object of the present invention to provide an improved wheel cover for a tire.

It is another object of the present invention to provide an improved wheel cover to cover the wheels of moving equipment.

It is still another object of the present invention to provide an improved wheel cover to cover the wheels of moving equipment so that the wheels would not leave any markings across the area where the wheels travel.

It is still a further object of the present invention to provide an improved wheel cover that would be placed over the outer circumference of each wheel and which covers the tread of the wheel thereby preventing the wheels from leaving marks across the area the where the wheels travel.

BRIEF DESCRIPTION OF THE PREFERRED EMBODIMENTS

In accordance with one embodiment of the present invention, an apparatus for covering a tire is disclosed. The apparatus has an elongated flexible piece of material of sufficient length to cover an outside circumference of the tire. The piece of material is used to cover the outside circumference of the tire and hence the tread of the tire. This prevents the tire tread from leaving marks on an area where the tire travels. A connector is further provided to couple the piece of material to the tire that is to be covered.

In accordance with another embodiment of the present invention, a method of providing an apparatus for covering a tire is disclosed. The method comprises the steps of: providing an elongated flexible piece of material of sufficient length to cover an outside circumference of the tire wherein the piece of material is used to cover the outside circumference of the tire to prevent the tire from leaving marks on an area where the tire travels; and providing a connector for connecting a first end of the piece of material to a second end of the piece of material thereby coupling the piece of material to the outside circumference of the tire.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

FIG. 1 is an elevated perspective view of one embodiment of the wheel cover of the present invention about to be coupled to a wheel of a dolly.

FIG. 2 is a side view of the wheel cover of FIG. 1 wherein the wheel cover is attached to the wheel of the dolly.

FIG. 3 is an elevated perspective view of the wheel cover of FIG. 1 detached from the wheel of the dolly.

FIG. 4 is a cross-sectional view of the wheel cover of FIG. 3 taken along line 4—4.

FIG. 8 is a top view of a third embodiment of the wheel cover of the present invention.

FIG. 9 is a side view of the wheel cover depicted in FIG. 8 wherein wheel cover ends are coupled together.

FIG. 10 is a side view of another alternative embodiment of a wheel cover wherein the wheel cover is attached to the wheel of the dolly.

FIG. 11 is an elevated perspective view of the wheel cover of FIG. 10 detached from the wheel of the dolly.

FIG. 12 is a close-up top view of the securing loops of the wheel cover depicted in FIG. 10 and 11.

FIG. 13a is a close-up side view of one of the securing loops as used on the wheel cover depicted in FIG. 10 and 11, shown along line 13 of FIG. 12.

FIG. 13b is a close-up side view of an alternative securing loop as used on the wheel cover depicted in FIG. 10 and 11, shown along line 13 of FIG. 12.

DETAILED DESCRIPTION OF THE PREFERRED EMBODIMENTS

Figure 5:
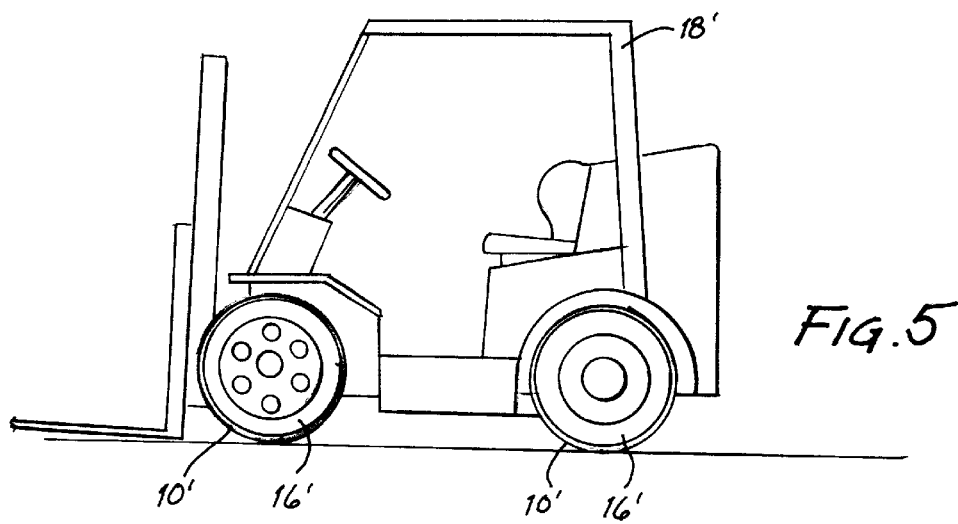
FIG. 5 is a side view of another embodiment of the wheel cover of the present invention coupled to the wheels of a forklift.

Referring to FIGS. 1–4 one embodiment of the wheel cover 10 of the present invention is shown. As may be seen in FIG. 1, the wheel cover 10 is used to cover a tire 16 so that the tire 16 will not leave any markings across the area the tire 16 travels across. In the preferred embodiment of the present invention, the wheel cover 10 is placed around the tire 16 of moving equipment so that the tires of the moving equipment will not leave any tire marks on the floor across which the moving equipment travels across. In the embodiment depicted in FIG. 1, the wheel cover 10 is used to cover the tire 16 of a hand pushed piece of moving equipment 18. Some examples of hand pushed moving equipment include, but is not limited to, dollies and man lifts. However, it should be noted that the wheel cover 10 may be used to cover the tire 16 of any type of moving equipment which uses wheels.

The wheel cover 10 uses an elongated piece of flexible material 12 (hereinafter material 12). Preferably, the material 12 should be of sufficient length to completely surround the outside circumference of the tire 16. The material 12 may be longer than the outer circumference of the tire 16 with the excess portion of the material 12 overlapping itself. In this manner, the wheel cover 10 may be used on a variety of different size tires 16. The material 12 should also be of sufficient width to completely cover the width of the tire 16 (i.e., the portion of the tire 16 in contact with the ground, or the tread portion of the tire 16). The material 12 is preferably made out of a flexible durable material 12 thereby ensuring the longevity of the wheel cover 10. Some examples of the material 12 may include, but is not limited to, leather, NAUGAHYDE®, vinyl, and the like.

After the material 12 is wrapped around the outer circumference of the tire 16, the material 12 is coupled together by a connector 14. The connector 14 is used to ensure that the material 12 is securely held around the outer circumference of the tire 16. In the embodiment depicted in FIGS. 1–4, the connector 14 is an adhesive tape. The adhesive tape connector 14 is used to coupled a first end of the material 12 to a second end or an overlap portion of the material 12 thereby securely holding the material 12 to the outer circumference of the tire 16.

Figure 6:
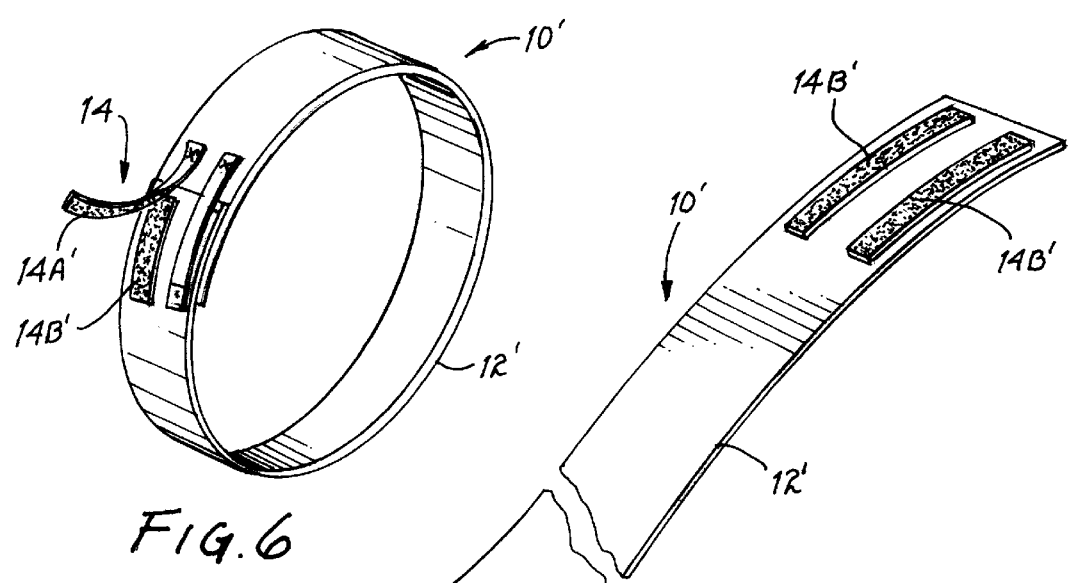
FIG. 6 is an elevated perspective view of the wheel cover depicted in FIG. 5 wherein the wheel cover ends are coupled together.
Figure 7:
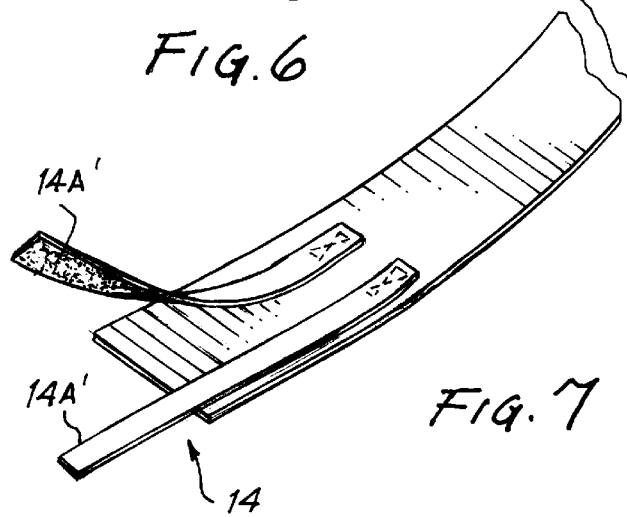
FIG. 7 is an elevated perspective view of the wheel cover depicted in FIG. 5 wherein the wheel cover ends are uncoupled.

Referring to FIGS. 5–7, wherein like numerals and symbols represent like elements with the exception of the use of the symbol "'" to indicate another embodiment, a second embodiment of the present invention is shown. Like the previous embodiment, the wheel cover 10' is used to cover a tire 16' so that the tire 16' will not leave any markings across the area the tire 16' travels across. In the embodiment depicted in FIG. 5, the wheel cover 10' is used to cover the tire 16' of a motorized piece of moving equipment 18'. Some examples of motorized moving equipment include, but is not limited to, scissor lifts, fork lifts, and condors. However, it should be noted that the wheel cover 10' may be used to cover the tire 16 of any type of moving equipment which has wheels.

The wheel cover 10' is similar to that shown in the previous embodiment. The wheel cover 10' uses an elongated piece of flexible material 12' (hereinafter material 12'). Preferably, the material 12' should be of sufficient length to completely surround the outside circumference of the tire 16'. The material 12' may be longer than the outer circumference of the tire 16' with the excess portion of the material 12' overlapping itself. In this manner, the wheel cover 10' may be used on a variety of different size tires 16'. The material 12' should also be of sufficient width to completely cover the width of the tire 16' (i.e., the portion of the tire 16' in contact with the ground, or the tread portion of the tire 16'). The material 12' is preferably made out of a flexible durable material 12' thereby ensuring the longevity of the wheel cover 10'. Some examples of the material 12' may include, but is not limited to, leather, NAUGAHYDE®, vinyl, and the like.

After the material 12' is wrapped around the outer circumference of the tire 16', the material 12' is coupled together by a connector 14'. The connector 14' is used to ensure that the material 12' is securely held around the outer circumference of the tire 16'. In the embodiment depicted in FIGS. 5–7, the connector 14' is a hook and loop connector 14'. The hook and loop connector 14' may be comprised of one or more connectors 14'. The hook and loop connector 14' functions by placing a hook strip 14A' on one end of the material 12' and placing a loop strip 14B' on a second end of the material 12'. After the material 12' is wrapped around the outer circumference of the tire 16', the material 12' is coupled together by connecting the hook strip 14A' to the loop strip 14B', or vice versa, thereby securely holding the material 12' to the outer circumference of the tire 16'.

Referring to FIGS. 8–9, wherein like numerals and symbols represent like elements with the exception of the use of the symbol "''" to indicate another embodiment, a third embodiment of the present invention is shown. Like the previous two embodiments, the wheel cover 10" is used to cover a tire so that the tire will not leave any markings across the area the tire travels across. The wheel cover 10' is preferably used to cover the tire of moving equipment (i.e., hand pushed or motorized).

The wheel cover 10" is similar in design to the previous two embodiments. The wheel cover 10" uses an elongated piece of flexible material 12" (hereinafter material 12"). Preferably, the material 12" should be of sufficient length to completely surround the outside circumference of the tire. The material 12" may be longer than the outer circumference of the tire with the excess portion of the material 12" overlapping itself. In this manner, the wheel cover 10" may be used on a variety of different size tires. The material 12" should also be of sufficient width to completely cover the width of the tire (i.e., the portion of the tire in contact with the ground, or the tread portion of the tire). The material 12" is preferably made out of a flexible durable material 12" thereby ensuring the longevity of the wheel cover 10". Some examples of the material 12' may include, but is not limited to, leather, NAUGAHYDE®, vinyl, and the like.

After the material 12" is wrapped around the outer circumference of the tire, the material 12" is coupled together by a connector 14". The connector 14" is used to ensure that the material 12" is securely held around the outer circumference of the tire. In the embodiment depicted in FIGS. 8–9, the connector 14" is a pair of grommet connectors 14". The grommet connectors 14" functions by placing a male grommet connector on one end of the material 12" and a female grommet connector on a second end of the material 12". After the material 12" is wrapped around the outer circumference of the tire, the material 12' is coupled together by coupling the male grommet connector to the female grommet connector or vice versa. The material 12" may further be securely coupled to the tire by using a second connector 15". The second connector 15" may be an adhesive strip or hook and loop strips.

Referring to FIGS. 10–13, wherein like numerals and symbols represent like elements with the exception of the use of number series in the 20s as opposed to previous numbers in the 10s; e.g. 10 is now 20, 12 is now 22; a fourth embodiment of the present invention is shown. Like the previous three embodiments, the wheel cover 20 is used to cover a tire 26 so that the tire 26 will not leave any markings across the area the tire 26 travels across. The wheel cover 20 is preferably used to cover the tire 26 of movable equipment (i.e., hand pushed or motorized).

The wheel cover 20 is similar in design to the previous three embodiments. The wheel cover 20 uses an elongated piece of flexible material 22 (hereinafter material 22). Preferably, the material 22 should be of sufficient length to completely surround the outside circumference of the tire. The material 22 may be longer than the outer circumference of the tire 26 with the excess portion of the material 22 overlapping itself. In this manner, the wheel cover 20 may be used on a variety of different size tires. The material 22 should also be of sufficient width to completely cover the width of the tire 26 (i.e., the portion of the tire 26 in contact with the ground, or the tread portion of the tire). The material 22 is preferably made out of a flexible durable material 22 thereby ensuring the longevity of the wheel cover 20. Some examples of the material 22 may include, but is not limited to, leather, NAUGAHYDE®, vinyl, and the like.

After the material 22 is wrapped around the outer circumference of the tire, the material 22 is coupled together by a connector 24. The connector 24 is used to ensure that the material 22 is securely held around the outer circumference of the tire. In the embodiment depicted in FIGS. 10–11, the connector 24 is a loop and hook connectors 24a and b. The loop and hook connector 24 functions by placing a hook portion 24a of the connector on one end of the material 22 and a loop portion 24b of the connector on a second end of the material 22. After the material 22 is wrapped around the outer circumference of the tire, the material 22 is coupled together by coupling the hook portion 24a connector to the loop portion 24b connector or vice versa. The material 22 may further be securely coupled to the tire 26 by using a second connector that is a series of securing loops 28. The securing loops 28 are coupled to the edge of the material 22 along both of the long sides. Once the material 22 has been wrapped around the tire 26 and the loop and hook connector 24 fastened, the wheel cover 20 may now be securely fastened by fastening opposite securing loops 28 to each other using bindings 30. The bindings 30 may be of many types. For example, the bindings 30 may be cords or ropes, and particularly well suited is shock cord material, or bungie cords as they are popularly known.

Referring to FIGS. 12 and 13, a close-up top view of the securing loops 28 attached to the material 22 is shown. A securing loop 28 may be in various formations. For example as shown herein, a securing loop 28a may be a loop of material attached with the ends of the securing loop 28a some distance apart as depicted by the attachment points X. As shown in FIG. 13a, the securing loop 28a is a relatively flat loop when viewed on edge. Alternatively, as shown in FIG. 13b, a securing loop 28b may be a loop of material folded back upon itself as shown herein.

Those skilled in the art will realize that many of the features of the various embodiments described and shown herein, particularly the fastening means and methods are interchangeable and/or combinable as the desire of the user.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for covering a tire comprising, in combination:

an elongated flexible piece of material having a first end and a second end detachable from said first end wherein said piece of material is of sufficient length to cover an outside circumference of said tire;

a connector for coupling said piece of material to said tire by coupling said first end to said second end; and a set of securing loops coupled to lengthwise edges of said piece of material.

2. An apparatus for covering a tire comprising, in combination:

an elongated flexible piece of material having a first end and a second end detachable from said first end wherein said piece of material is of sufficient length to cover an outside circumference of said tire wherein said piece of material is used to cover said outside circumference of said tire to prevent said tire from leaving marks on an area said tire travels across;

a connector for connecting said first end of said piece of material to said second end of said piece of material thereby coupling said piece of material to said tire; and a set of securing loops coupled to lengthwise edges of said piece of material.

3. A method of providing an apparatus for covering a tire comprising, in combination:

providing an elongated flexible piece of material having a first end and a second end detachable from said first end and of sufficient length to cover an outside circumference of said tire wherein said piece of material is used to cover said outside circumference of said tire to prevent said tire from leaving marks on an area said tire travels across;

providing a connector for connecting said first end of said piece of material to said second end of said piece of material thereby coupling said piece of material to said tire;

providing a set of securing loops coupled to lengthwise edges of said piece of material.

* * * * *